US006671962B2

(12) United States Patent
Watamura

(10) Patent No.: US 6,671,962 B2
(45) Date of Patent: Jan. 6, 2004

(54) PIPE CUTTING TOOL FOR PLASTIC PIPE

(76) Inventor: Abe Watamura, 6626 Gatto St., El Cerrito, CA (US) 94530

( * ) Notice: Subject to any disclaimer, the term of this patent is extended or adjusted under 35 U.S.C. 154(b) by 0 days.

(21) Appl. No.: 09/873,770

(22) Filed: Jun. 4, 2001

(65) Prior Publication Data

US 2002/0178587 A1 Dec. 5, 2002

(51) Int. Cl.[7] .......... B23D 21/10
(52) U.S. Cl. .......... 30/96; 30/95
(58) Field of Search .......... 30/93, 94, 95, 30/101, 96

(56) References Cited

U.S. PATENT DOCUMENTS

| | | | | |
|---|---|---|---|---|
| 823,796 A | * | 6/1906 | Leyes | 30/95 |
| 1,279,022 A | * | 9/1918 | Scott | 30/96 |
| 2,379,177 A | * | 6/1945 | Pavey | 30/99 |
| 3,036,377 A | * | 5/1962 | Paulson | 30/301 |
| 4,092,774 A | | 6/1978 | Watts | |
| 4,114,266 A | * | 9/1978 | Erpenbeck | 30/96 |
| 4,146,959 A | | 4/1979 | Hopper | |
| 4,368,577 A | | 1/1983 | Babb | |
| 4,446,620 A | | 5/1984 | Velte | |
| 4,646,438 A | | 3/1987 | Hessler | |
| 4,785,538 A | | 11/1988 | Meyer | |
| 4,837,931 A | | 6/1989 | Beermann | |
| 4,845,849 A | | 7/1989 | Aubriot | |
| 5,018,275 A | | 5/1991 | Huang | |
| 5,067,240 A | | 11/1991 | You | |
| 5,129,158 A | | 7/1992 | Campagna | |
| 5,179,781 A | | 1/1993 | Weaver | |
| 5,203,083 A | | 4/1993 | Domonoske | |
| 5,218,765 A | | 6/1993 | Huang | |
| 5,301,427 A | | 4/1994 | Swatek | |
| 5,373,639 A | | 12/1994 | Huang | |
| 5,956,853 A | * | 9/1999 | Watamura | 30/95 |

* cited by examiner

*Primary Examiner*—Hwei-SIu Payer
(74) *Attorney, Agent, or Firm*—Hogan & Hartson L.L.P.

(57) ABSTRACT

A tool for cutting a plastic pipe includes an annular collar having a fixed inner diameter which adapted to be slidably positioned on and encircling the plastic pipe. The tool further includes a cutting member pivotably attached to the annular collar an alignment ring having a fixed inner diameter which is adapted to be slidably positioned on and encircling the plastic pipe abutting the annular collar. The tool includes an element for maintaining the alignment ring in temporary engagement encircling the pipe, with the annular collar abutted next to the alignment ring.

9 Claims, 9 Drawing Sheets

PIPE CUTTING TOOL FOR PLASTIC PIPE

FIELD OF THE INVENTION

This invention relates to pipe cutting tools, and more particularly, to pipe cutting tools for plastic pipes.

BACKGROUND OF THE INVENTION

Homeowners have traditionally relied upon plumbers to repair and replace faulty plumbing. Professional plumbers are needed, in part, because older plumbing utilizing metal pipe, which require special equipment and experience to cut, repair and weld. The obvious difficulty in cutting metal pipe arises from the hardness of the steel or other metal used.

Although plastic pipe is now commonly used in new homes, plastic pipe can be difficult to cut to size because of its flexibility. For example, when attempting to cut plastic pipe with a hand saw to a desired length, application of sawing force to the pipe causes the pipe to bow, which results in an uneven cut. A pipe with an unevenly cut end may not be usable for attachment at the joint to which it is to be bonded.

While special tools have been developed to cut plastic pipe for use by plumbers and other skilled persons, some of such equipment is complicated to use, bulky or expensive, and thus not suitable for use by a homeowner or other unskilled person who may only need to cut a single length of plastic pipe. One special tool is described in U.S. Pat. No. 5,956,853 entitled PIPE CUTTING TOOL FOR PLASTIC PIPE, which issued Sep. 28, 1999, to the inventor hereof, and which is incorporated in its entirety herein. This patent describes a preferred embodiment of a pipe cutting tool which includes an annular collar in which a radial expansion slot for expansion of the collar and frictional engagement of the collar with the pipe to be cut. The preferred embodiment includes a cutting member having a blade mounted between opposing first and second blade holding members and a biasing spring attached to the first blade holding member, for pivotal attachment to the annular collar. In this arrangement the spring biasing member helps maintain contact of the cutting member with the plastic pipe to be cut. This configuration can, however, be complex to manufacture.

Thus, there remains a need for a plastic pipe cutting tool which is both inexpensive to manufacture and easy to use by an unskilled person. It is against this background that the significant improvements and advancements of the present invention have taken place.

OBJECTS OF THE INVENTION

It is the principal object of the present invention to develop a pipe cutting tool which may be easily operated by an unskilled person.

It is a further object of the present invention to develop a pipe cutting tool which will produce a clean and even cut fully transverse and perpendicular to the longitudinal axis of the pipe.

It is a yet further object of the present invention to develop a pipe cutting tool which can be economically made for use by homeowners or other unskilled persons, and which does not require the use of a vise, welding equipment or other tools or special knowledge to operate.

SUMMARY OF THE INVENTION

In accordance with the major aspects of the present invention, a tool for cutting an elongated plastic pipe is disclosed which includes (i) an annular collar having a fixed diameter, which is selectively positionable on the pipe for slideable movement along the length of the pipe to a predetermined position and separate selectable rotational movement about the predetermined position, (ii) a cutting member pivotably mounted to the annular collar, with the cutting member and annular collar rotated about the predetermined position, forming a circular score in the pipe until the pipe cutting through the initial score is complete, and (iii) an alignment ring also having a fixed diameter, which is selectively positioned to a predetermined position encircling the pipe and having means for releasable attachment to the pipe.

In a preferred embodiment of the present invention, the cutting member is pivotably mounted to the annual collar and includes a blade embedded in a molded blade holder. The biasing force needed to cut the pipe is preferably provided by pressure applied with the operator's thumb to the cutting member. A biasing means such as a spring may also be used. In one preferred embodiment, the cutting member includes a widened portion which accommodates the operator's thumb.

To use the pipe-cutting tool of the present invention, the alignment ring and annual collar are slid onto the pipe to predetermined positions side-by-side, with the leading edge of the annual collar adjacent the length of the pipe to be cut. The alignment ring is then releasably fixed into position. Thereafter, the annual collar is rotated about the pipe (or alternatively, the pipe rotated while holding the annual collar), while the annual collar is forced to maintain abutting contact with the alignment ring and a biasing force applied to the cutting member. Once the pipe is scored and cut, the alignment ring released from its fixed position on the pipe, and the alignment ring and annual collar are removed.

The aforementioned tool can be manufactured easily and economically, and thus may be made available to homeowners at an affordable price. When a homeowner or unskilled person utilizes the cutting tool of the present invention to cut a plastic pipe, a pipe end is produced which is even and fully transverse to the length of the pipe. The cleanly cut pipe end so produced is achieved without requiring the use of a vise, welding equipment or other tools or special knowledge.

A more complex appreciation of the present invention and its scope can be obtained from understanding the following detailed description of presently preferred embodiments of the invention, and the appended claims.

DETAILED DESCRIPTION OF THE INVENTION

Figure 1:
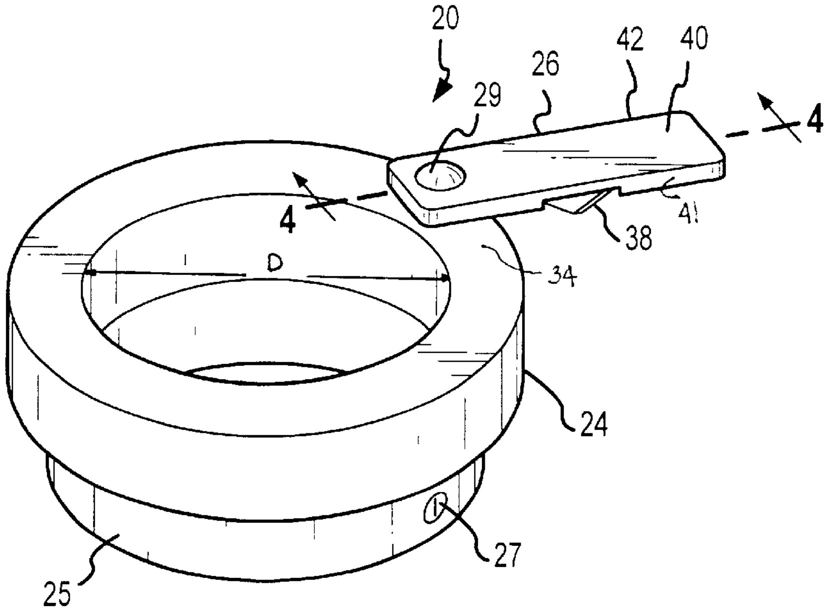
FIG. 1 is an isometric view of preferred embodiment of the pipe cutting tool of the present invention.
Figure 2:
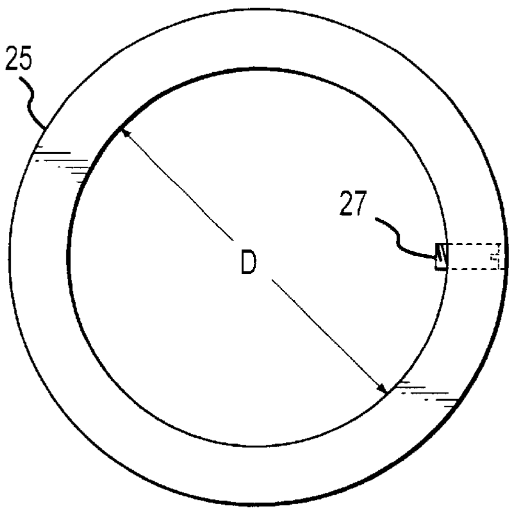
FIG. 2 is a top view of the alignment ring component of the pipe cutting tool shown in FIG. 1.
Figure 3:
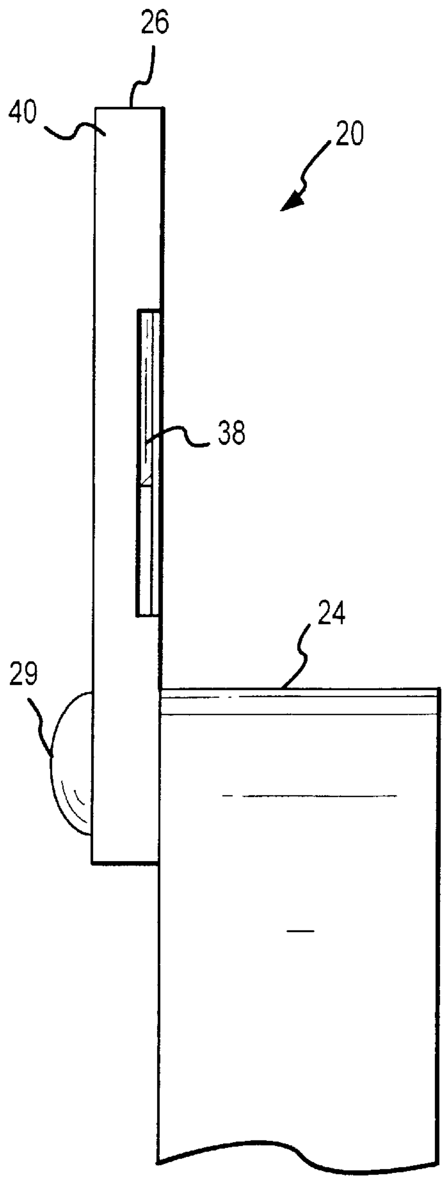
FIG. 3 is a side view of the pipe cutting member component of the tool shown in FIG. 1.
Figure 4:
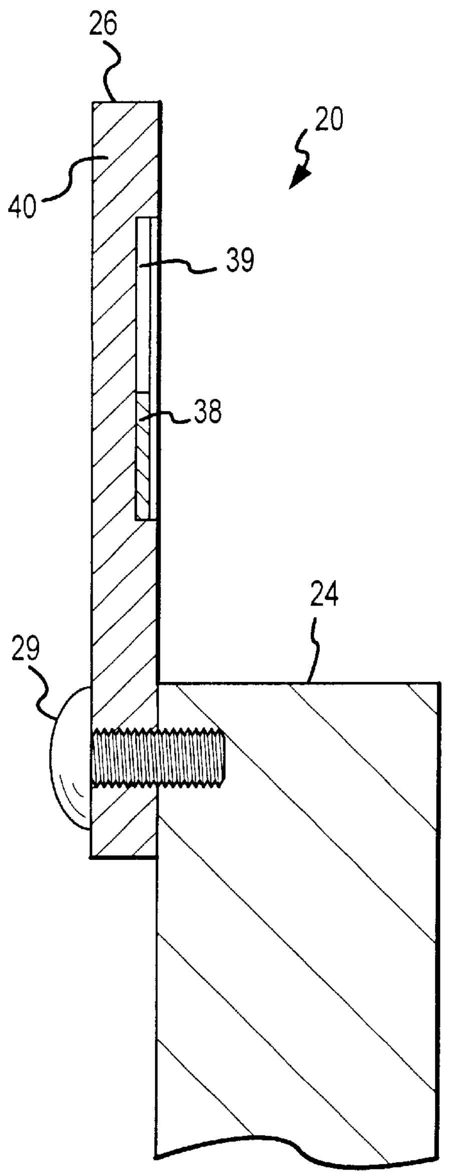
FIG. 4 is a section view of the cutting member component of the pipe cutting tool shown in FIG. 1, taken through the line 4—4 of FIG. 1.
Figure 5:
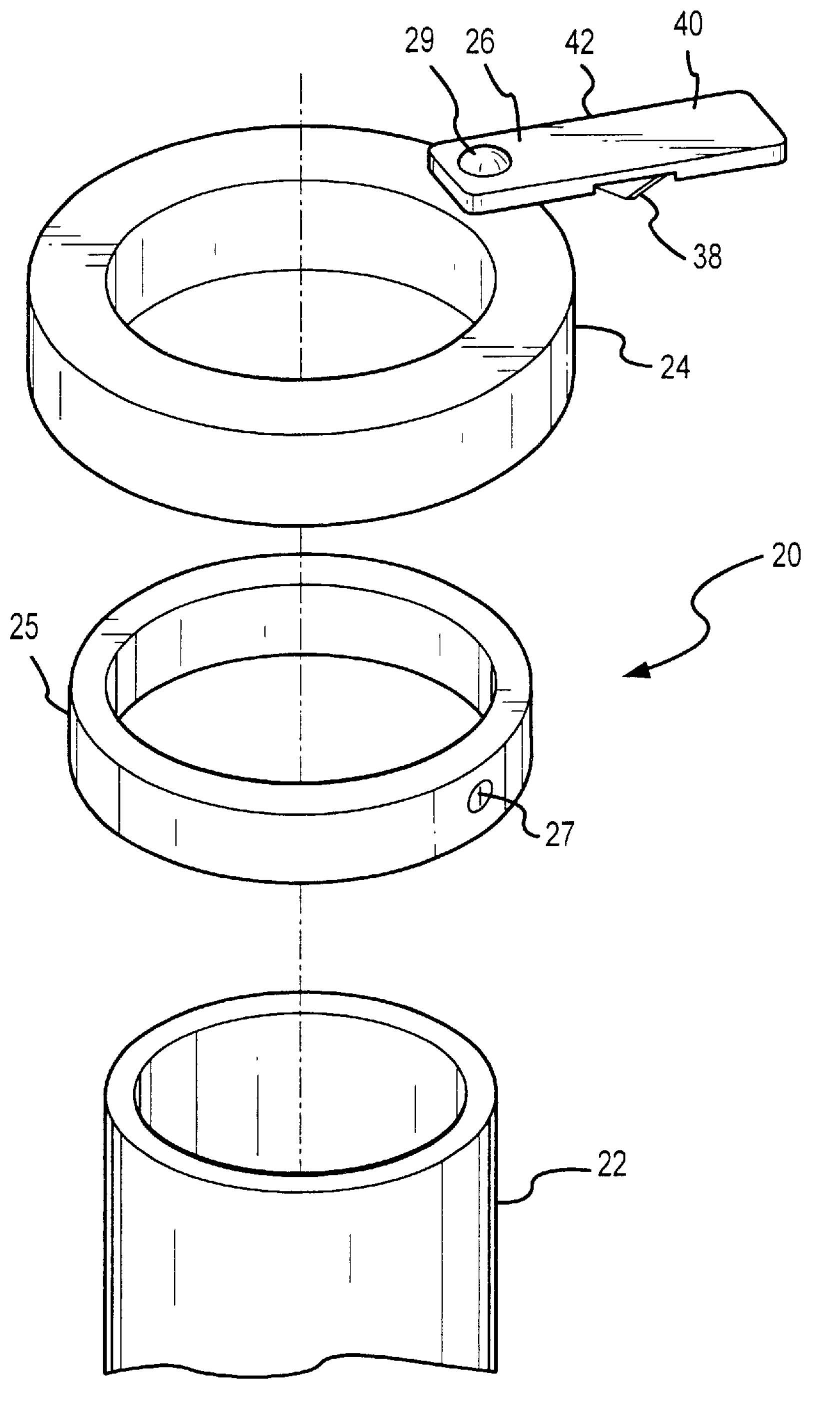
FIG. 5 is an exploded view of the pipe cutting tool shown in FIGS. 1–4, prior to final positioning of all components on a pipe to be cut with the tool.
Figure 6:
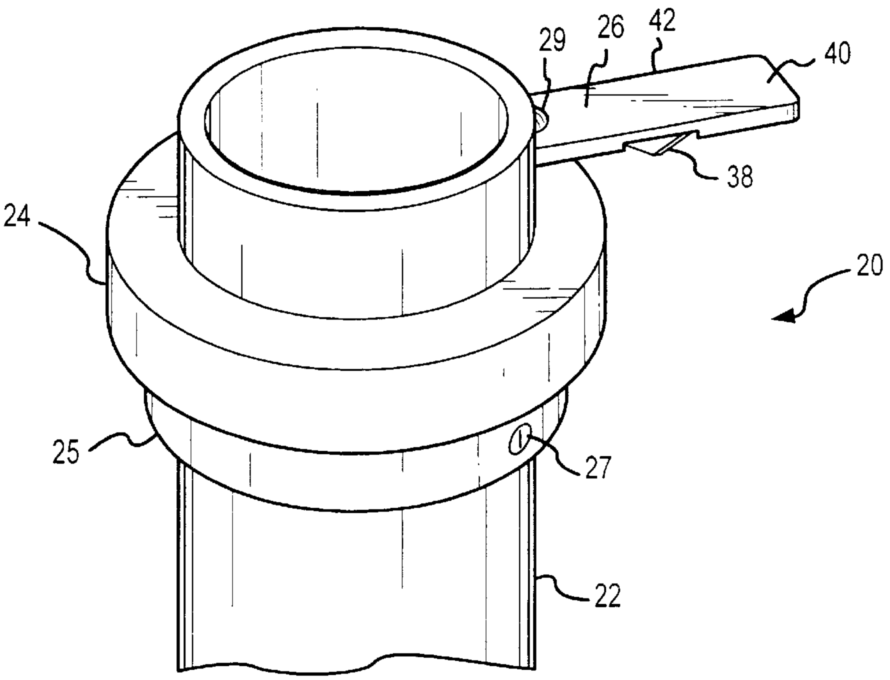
FIG. 6 is an isometric view of the pipe cutting tool shown in FIG. 5 mounted on the pipe to be cut with the tool.
Figure 7:
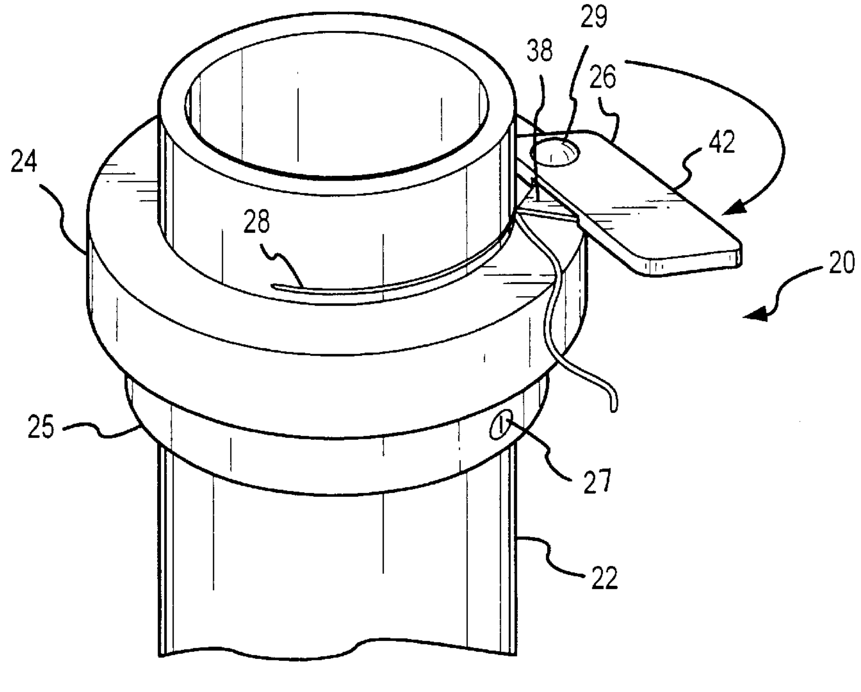
FIG. 7 is an isometric view of the pipe cutting tool shown in FIG. 6, mounted on the pipe to be cut, with the pipe partially cut.
Figure 8:
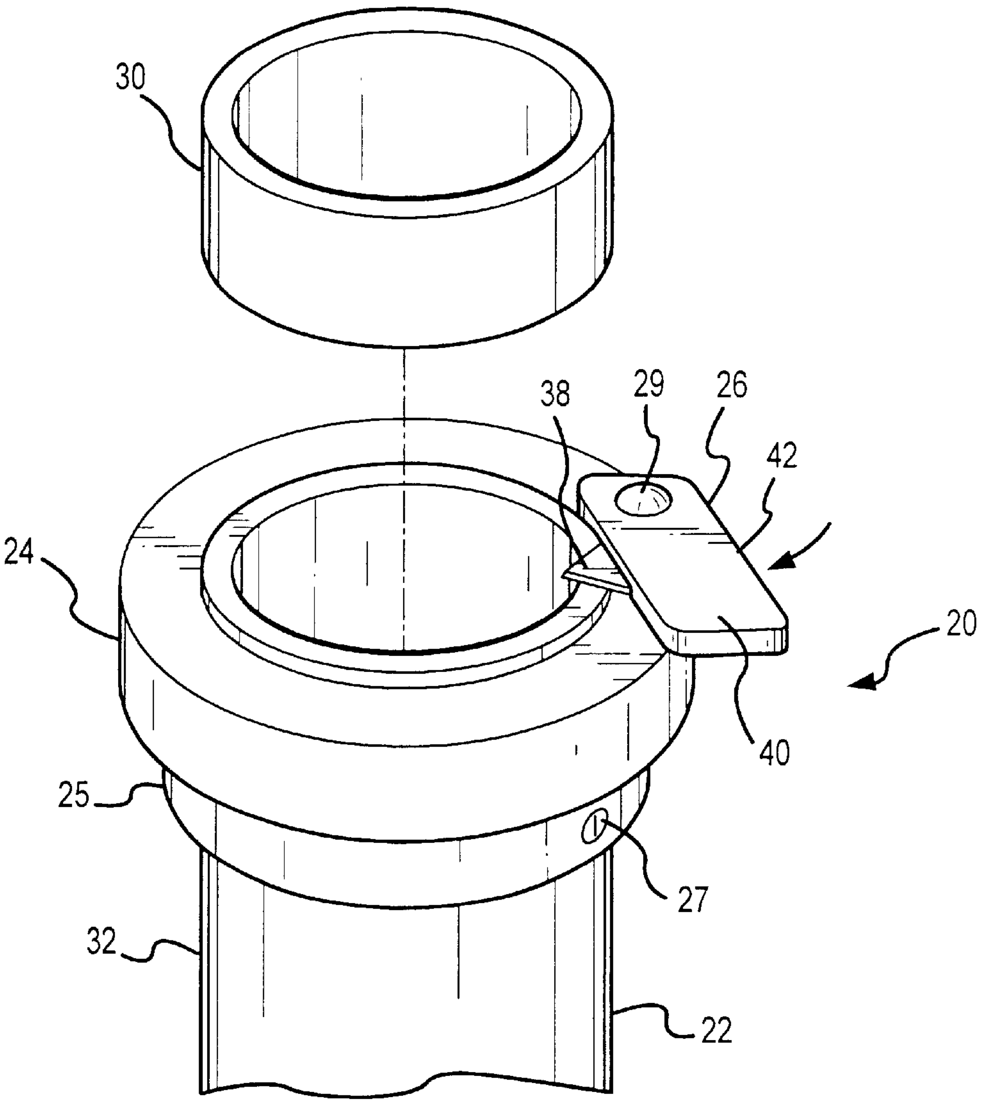
FIG. 8 is an isometric view of the pipe cutting tool and pipe shown in FIG. 7, with the pipe fully cut.

In accordance with the present application, and as shown in FIGS. 1–8, a tool 20 for cutting an elongated pipe 22 is disclosed which includes an annular collar 24 having a fixed diameter. The annular collar is selectively positionable on pipe 22 for slideable movement along the length of pipe 22 to a predetermined position and separate selectable rotational movement about the predetermined position. A cutting member 26 is pivotably mounted to annular collar 24 through a first fastener 29, so that as collar 24 and cutting member 26 are rotated about the predetermined position, a circular score 28 (FIG. 7) is formed on pipe 22. Further rotation of cutting tool 20 results in the cutting of pipe 22 through score 28 into pipe sections 30 and 32 (FIG. 8). To fix the alignment of the annular collar 24 on the pipe 22 during pipe cutting operations, pipe cutting tool 20 includes an alignment ring 25 having a fixed inner diameter, which is selectively positional on pipe 22 and then releasably affixed to pipe 22 by means of locking screw 27.

More particularly, annular collar 24 of cutting tool 20 includes a side wall 34 to which cutting member 26 is pivotably mounted through a first fastener 29. Collar 24 has an inside diameter "D" which is preferably equal to the outside diameter of the pipe to be cut.

Cutting member 26 of the preferred embodiment includes a blade 38 receivably mounted in an aluminum blade holding member 40 and extending from a forward facing portion 41 of holding member 40. In the preferred embodiment, blade 38 is placed in a slot 39 formed in blade holding member 40 and blade holding member is then sledged to compress portions of blade holding member 40 around blade 38 to fixedly maintain blade 38 in blade holding member 40. A rearward facing portion 42 of blade hold member provides a surface against which the operator's thumb or fingers may be placed to provide a biasing force to the blade cutting member and cut the pipe.

Alignment ring 25 also has a fixed inside diameter D1 (FIG. 2) which is approximately equal to or at most only slightly larger than to the outside diameter of the pipe to be cut. Locking screw 27 is adapted for either extending to frictionally engage the pipe to be cut and thereby holding alignment ring 25 in frictional engagement with the pipe to be cut, or withdrawal outwards, thereby releasing alignment ring 25 from fixed frictional engagement with the pipe to be cut. Although a thumb screw is the preferred locking screw 27, any equivalent fastener (such as a phillips head screw, a flat head screw or other fastener known to those of ordinary skill in the art, may be used).

A plastic pipe is cut with the pipe cutting tool 20 of the present invention as show in FIGS. 6–8. Referring first to FIG. 6, it is seen that alignment ring 25 is mounted on pipe 22, encircling pipe 22 with locking screw 27 frictionally engaging pipe 22 and annular collar 24 positioned abutting alignment ring 25 and also encircling pipe 22. Prior to initiating pipe cutting operations, cutting member 26 is pivotably rotated, so that blade 38 is spaced apart from the surface of pipe 22.

To initiate cutting operations, cutting member 26 is then pivotably rotated so that blade 38 contacts pipe 22. A biasing force is then applied through cutting member 26, which brings blade 38 in contact with pipe 22, which results in a part or score 28 forming in pipe 22 (FIG. 7). Rotation of cutting member 26 about pipe 22, or alternatively, rotation of pipe 22 within cutting member 26, causes the score to deepen until pipe 22 is cut into sections 30 and 32 (FIG. 8.

Figure 9:
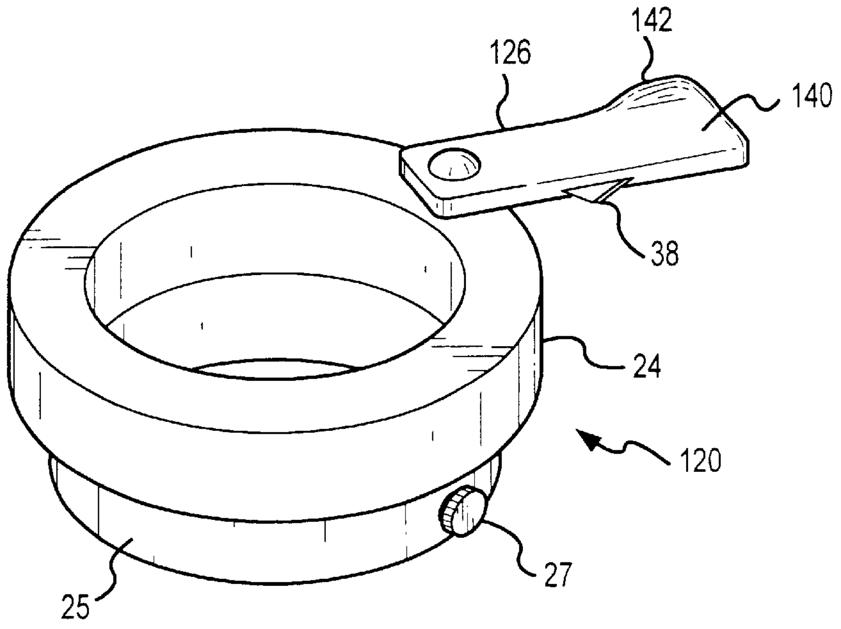
FIG. 9 is an isometric view of an alternative embodiment of the pipe cutting tool of the present invention.

An alternative embodiment of pipe cutting tool 120 is shown in FIG. 9. All components of pipe cutting tool 120 are the same as for pipe cutting tool 20, except that cutting member 126 includes a blade holding member 140 which is manufactured from molded plastic and includes an expanded back facing portion 142 which serves as a thumb rest against which a biasing force can be comfortably applied.

Figure 10:
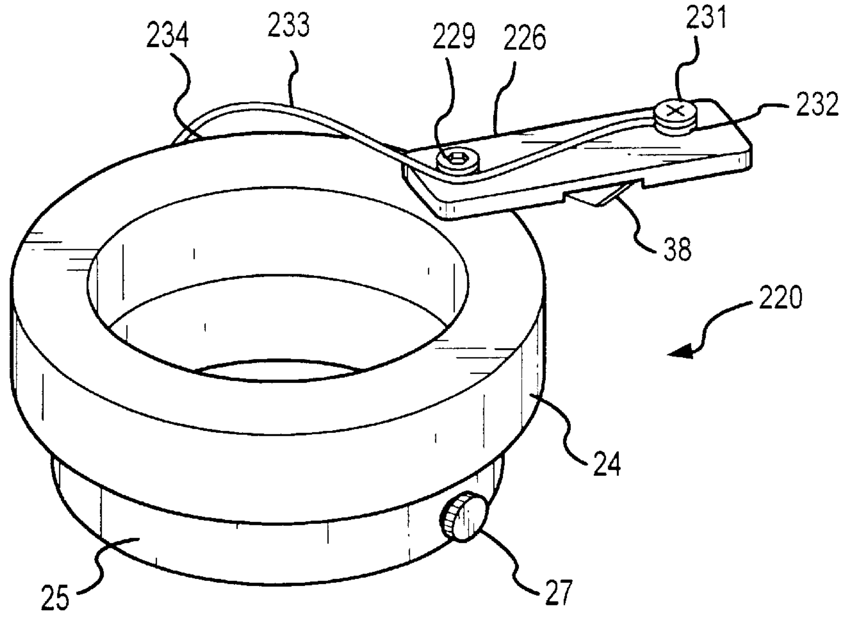
FIG. 10 is an isometric view of another embodiment of the pipe cutting tool of the present invention.

Another alternative embodiment of pipe cutting tool 220 is shown in FIG. 10. In this embodiment, a sledged aluminum blade holding member 226 includes a first fastener 229 and a second fastener 231 at opposing ends of blade holding member 226. Mounted between second fastener 231 and the top surface of blade holding member 226 is a first end 232 of spring 233. An opposing second end 234 of spring 233 frictionally engages pipe 22 during pipe cutting operations, thereby supply a biasing force to blade 38, to allow cutting operations to proceed, as is more fully described in applicant's U.S. Pat. No. 5,956,853.

Figure 11:
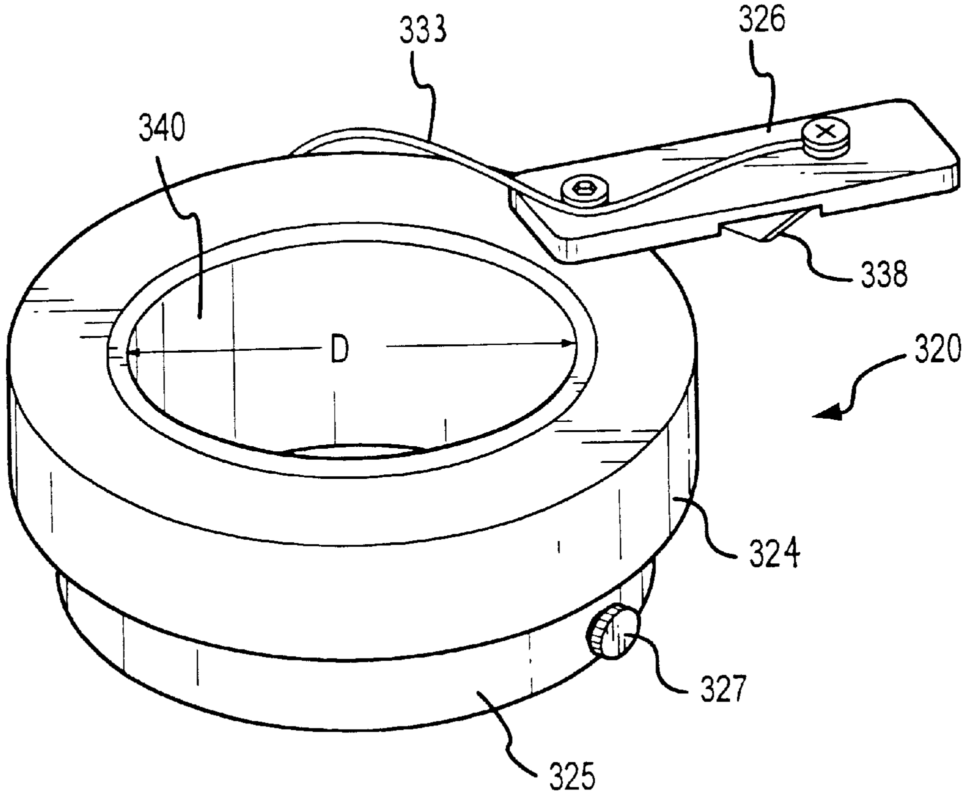
FIG. 11 is an isometric view of yet another embodiment of the pipe cutting tool of the present invention.
Figure 12:
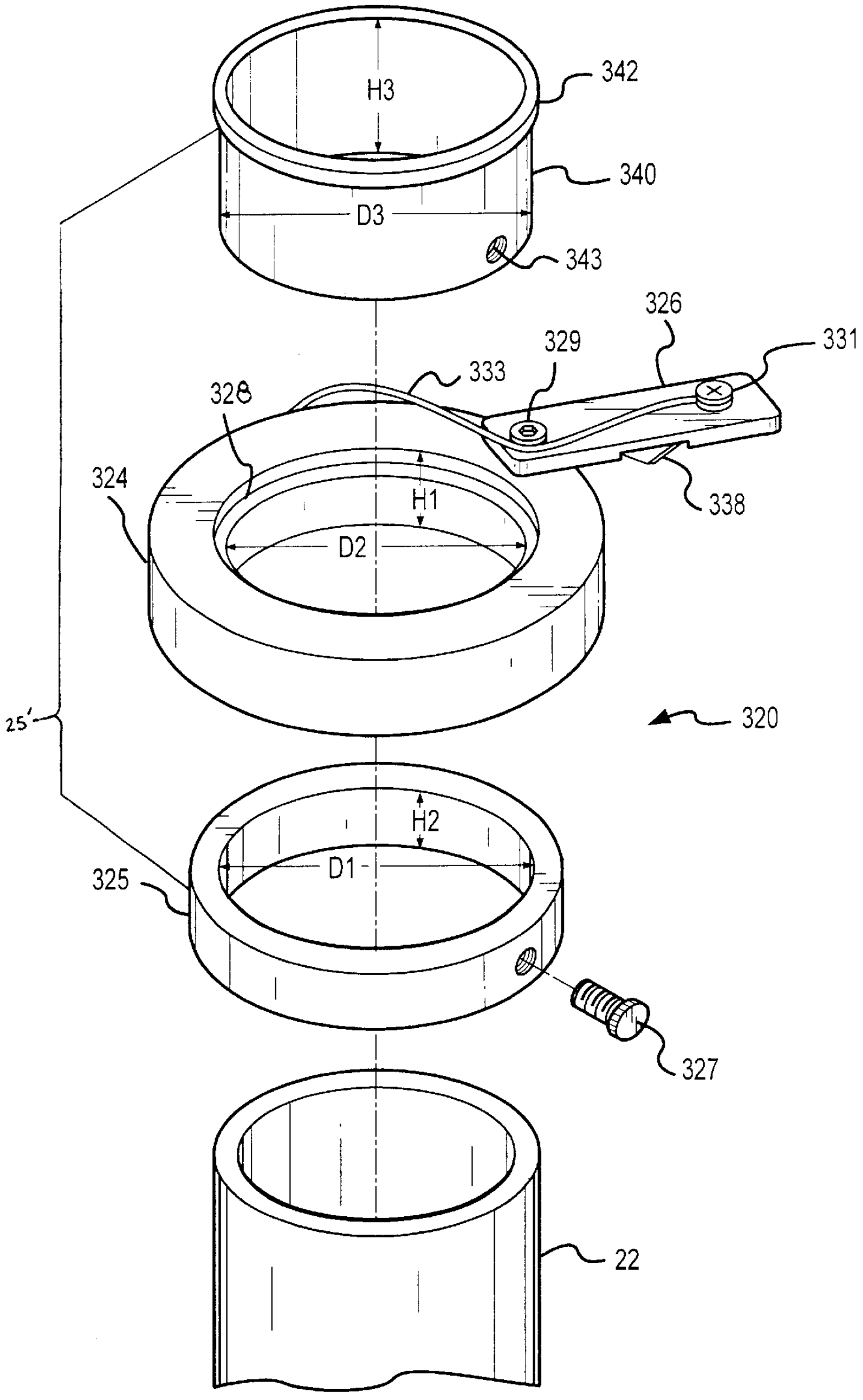
FIG. 12 is an exploded view of the pipe cutting tool shown in FIG. 11.

Referring now to FIGS. 11 and 12, an embodiment 320 of the pipe cutting device of the present invention is disclosed which includes an annular collar 324 having a fixed inner diameter D2 and a height H1. A cutting member 326 including a blade 338 is pivotably attached to annular collar 324 through first fastener 329. Cutting member 326 also includes a fastener 331 with which spring 333 is attached to the device. Annular collar 324 has a hole formed in the end of collar 324 through which cutting member 326 is attached. Pipe cutting tool 320 also includes an alignment ring 25' having a fixed inner diameter D which is approximately equal to or slightly larger than the outside diameter of the pipe 22 to be cut. Alignment ring 25' includes an outer portion 325 and an inner portion 340. Inner portion 340 has a fixed inner diameter D and height H3. Outer portion 325 has a fixed inner diameter D1 and a height H2. Formed in alignment ring 25' is a hole 343 which has an outer length and an inner length extending through outer portion 325 and inner portion 340, respectively. A fastener 327 is adapted for mounting in hole 343, and is inserted through outer and inner lengths. Alignment ring 25' further includes a circumferential lip 342 formed in inner portion 340 which is adapted to be received in circumferential channel 328 formed in annular collar 324.

The components of cutting tool 320 are sized so as to be readily assembled in a closely fitting manner, as follows. Inner diameter D of alignment ring 25' is approximately equal to or only slightly larger than the outside diameter of the pipe 22 to be cut. Outer diameter D3 of inner portion 340 is greater than inner diameter D of alignment ring 25' by an amount equal to two times the thickness of the side wall of inner portion 340. Inner diameter D1 of outer portion 325 is approximately equal to inner diameter D2 of annular collar 324. Outer diameter D3 of inner portion 340 is approximately equal to or slightly smaller than both D1 and D2, so that inner portion 340 of alignment ring 25' can be positioned snugly inside both annular collar 324 and outer portion 325, as is shown in FIG. 11. Inner portion 340 is prevented from "falling though" annular collar 324 by engagement of circumferential lip 342 in channel 328. In the embodiment shown in FIGS. 11 and 12, height H3 of inner portion 340 is approximately equal to the combined heights of annular collar 324 and outer portion 325.

To cut pipe 22 with pipe cutting tool 320, the fully assembled tool 320 is slid along the length of pipe 22 until the blade 338 is adjacent the position on pipe 22 to be cut. Fastener 327 is then tightened in frictional engagement with pipe 22, thereby preventing both inner and outer portions 340 and 325 from further movement. Annular collar 324 remains free to rotate about pipe 22 but is prevented from movement along the longitudinal axis of pipe 22 by outer portion 325 of alignment ring 25' and at the other end by circumferential lip 342 of inner portion 340 of alignment ring 25'. Spring 333 (optional) provides a biasing force which impinges blade 338 against pipe 22, initially scoring pipe 22 and eventually cutting through pipe 22, as described above. It should be noted that preferably, blade 338 has a straight edge rather than a triangular edge, thereby cutting pipe 22 in a parting mode (akin to a planing action) rather than employing a knife-like cutting action, although the latter action can be used.

Figure 13:
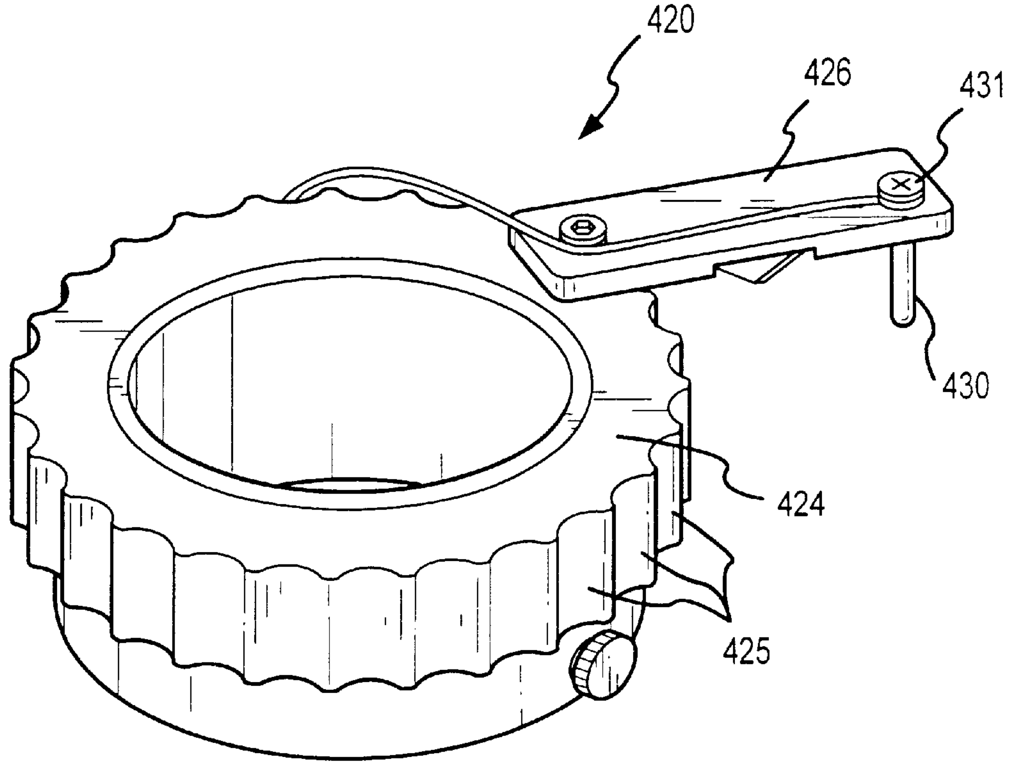
FIG. 13 is an isometric view of a further embodiment of the pipe cutting tool of the present invention.

Referring now to FIG. 13, a further embodiment 420 of the pipe cutting tool of the present invention is disclosed having an annular collar 424 and cutting member 426. In this embodiment, which includes an alignment ring like that shown in FIGS. 11–12 but may include an alignment ring like that shown in other embodiments discussed herein, cutting member 426 includes a fastener 431 which has an extended portion 430 against which a biasing force may be more easily applied with a digit of the operator. Pipe cutting tool 420 also includes ridges 425 formed in annular collar 424 which provide a surface which can be easily grasped.

It can be readily seen that the pipe cutting tool of the present invention can be easily used by an unskilled person to cut to plastic pipe. The pipe cutting tool can be used in a confined space. When a homeowner or unskilled person utilizes the cutting tool of the present invention to cut a plastic pipe, a pipe end is produced which is even and perpendicular to the length of the pipe. The cleanly cut pipe end so produced is achieved without requiring the use of a vise, welding equipment or other tools or special knowledge. It can be manufactured easily and economically, and thus can be made available to homeowners at an affordable price.

Presently preferred embodiments of the present invention and many of its improvements have been described with a degree of particularity. It should be understood that this description has been made by way of preferred examples and that the invention is defined y the scope of the following claims.

What is claimed is:

1. A tool for cutting a plastic pipe comprising:

an annular collar having a fixed inner diameter, adapted to be slidably position on and encircling the plastic pipe;

a cutting member pivotably attached to the annual collar;

an alignment ring having a fixed inner diameter adapated to be slidably positioned on and encircling the plastic pipe abutting the annular collar;

means for maintaining the alignment ring in temporary engagement encircling the pipe;

a circumferential channel formed in the annular collar; and a circumferential lip extending from the alignment ring, wherein the alignment ring is adapted to be received in the circumferential channel.

2. The tool for cutting pipe according to claim 1, wherein the alignment ring further comprises:

an inner portion from which the circumferential lip extends; and an outer portion, wherein the alignment ring has a hole formed therethrough which extends through the inner portion and through the outer portion, and wherein the mans for maintaining the alignment ring in temporary engagement encircling the pipe is a fastener mounted in the hole which is adapted to extend and frictionally engage the pipe.

3. The tool for cutting pipe according to claim 2, wherein the annular collar has a fixed inner diameter D2 and a height H1 and the alignment ring further comprises:

a fixed inner diameter D, a fixed outer diameter D3 and a height H3 of said inner portion; and a fixed inner diameter D1 and a height H2 of said outer portion, wherein H3 is approximately equal to H1+H2, D1 is approximately equal to D2 and D<D1.

4. The tool for cutting pipe according to claim 3, further comprising:

means for applying a biasing force to the cutting member.

5. The tool for cutting pipe according to claim 4, wherein the annular collar has ridges formed therein to prevent slippage when cutting a pipe with the tool.

6. The tool for cutting pipe according to claim 1, wherein the annular collar has a fixed inner diameter D2 and a height H1 and the alignment ring further comprises:

a fixed inner diameter D, a fixed outer diameter D3 and a height H3 of said inner portion; and a fixed inner diameter D1 and a height H2 of said outer portion, wherein H3 is approximately equal to H1+H2, D1 is approximately equal to D2 and D<D1.

7. The tool for cutting pipe according to claim 6, wherein the alignment ring further includes a hole formed therethrough and the means for maintaining the alignment ring in temporary engagement encircling the pipe is a fastener mounted in the hole which is adapted to extend and frictionally engage the pipe.

8. The tool for cutting pipe according to claim 1, further comprising:

means for applying a biasing force to the cutting member.

9. The tool for cuffing pipe according to claim 8, wherein the alignment ring further includes a hole formed therethrough and the means for maintaining the alignment ring in temporary engagement encircling the pipe is a fastener mounted in the hole which is adapted to extend and frictionally engage the pipe.

* * * * *